US006985935B1

(12) United States Patent
Zhang et al.

(10) Patent No.: US 6,985,935 B1
(45) Date of Patent: Jan. 10, 2006

(54) METHOD AND SYSTEM FOR PROVIDING NETWORK ACCESS TO PPP CLIENTS

(75) Inventors: Shujin Zhang, San Carlos, CA (US); Charles T. Yager, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 718 days.

(21) Appl. No.: 09/745,293

(22) Filed: Dec. 20, 2000

(51) Int. Cl.
*G06F 15/16* (2006.01)

(52) U.S. Cl. ...................... 709/219; 709/223; 709/227; 370/401; 370/462

(58) Field of Classification Search ................ 709/203, 709/223–229; 370/400–401, 410, 420, 422, 370/462–463
See application file for complete search history.

(56) References Cited

U.S. PATENT DOCUMENTS

| | | | | |
|---|---|---|---|---|
| 5,241,594 | A | 8/1993 | Kung | 380/4 |
| 5,655,077 | A | 8/1997 | Jones et al. | 395/187.01 |
| 5,671,354 | A | 9/1997 | Ito et al. | 395/187.01 |
| 5,684,950 | A | 11/1997 | Dare et al. | 395/187.01 |
| 5,708,780 | A | 1/1998 | Levergood et al. | 395/200.12 |
| 5,715,394 | A | 2/1998 | Jabs | 395/200.11 |
| 5,812,529 | A | 9/1998 | Czarnik et al. | 370/245 |
| 5,815,665 | A | 9/1998 | Teper et al. | 395/200.59 |
| 5,835,727 | A | 11/1998 | Wong et al. | 395/200.68 |
| 5,845,070 | A | 12/1998 | Ikudome | 395/187.01 |
| 5,894,557 | A * | 4/1999 | Bade et al. | 709/228 |
| 5,898,780 | A | 4/1999 | Liu et al. | 380/25 |
| 5,918,019 | A * | 6/1999 | Valencia | 709/227 |
| 5,933,625 | A | 8/1999 | Sugiyama | 395/557 |
| 5,944,824 | A | 8/1999 | He | 713/201 |
| 5,968,116 | A | 10/1999 | Day, II et al. | 709/202 |
| 5,974,453 | A | 10/1999 | Andersen et al. | 709/220 |
| 5,987,232 | A | 11/1999 | Tabuki | 395/187.01 |

(Continued)

FOREIGN PATENT DOCUMENTS

WO 99/53408 10/1999

OTHER PUBLICATIONS

Bellovin, Steven M., "Problem Areas for the IP Security Protocols", Jul. 22-25, 1996, Proceedings of the Sixth Usenix UNIX Security Symposium, San Jose, CA.

(Continued)

*Primary Examiner*—Ario Etienne
*Assistant Examiner*—LaShonda Jacobs
(74) *Attorney, Agent, or Firm*—Thelen Reid & Priest LLP; Masako Ando

(57) ABSTRACT

A system provides computer network access to PPP clients. The system includes (a) receiving a PPP session creation request from a client, the PPP session creation request including a control protocol frame encapsulated therein, (b) obtaining user domain information associated with the PPP session creation request, (c) setting up a Layer 2 tunnel according to a parameter contained in the control protocol frame, (d) creating an ingress PPP object associated with an incoming PPP session, a host object associated with the client, and an egress PPP object associated with the Layer 2 tunnel, (e) creating an egress IP object based upon obtained user domain information, the egress IP object associated with IP-based forwarding, (f) linking the ingress PPP object, the host object, and the egress PPP object, thereby forwarding data packets from a PPP session with the client over the Layer 2 tunnel, and (g) linking the host object and the egress IP object, thereby forwarding IP frames received from the client over a link other than the Layer 2 tunnel.

59 Claims, 5 Drawing Sheets

U.S. PATENT DOCUMENTS

| | | | | |
|---|---|---|---|---|
| 5,991,810 | A | 11/1999 | Shapiro et al. | 709/229 |
| 5,991,828 | A | 11/1999 | Horie et al. | 710/8 |
| 6,006,334 | A | 12/1999 | Nguyen et al. | 713/202 |
| 6,009,103 | A | 12/1999 | Woundy | 370/401 |
| 6,011,910 | A | 1/2000 | Chau et al. | 395/200.59 |
| 6,021,429 | A | 2/2000 | Danknick | 709/202 |
| 6,021,496 | A | 2/2000 | Dutcher et al. | 713/202 |
| 6,026,441 | A | 2/2000 | Ronen | 709/227 |
| 6,044,155 | A | 3/2000 | Thomlinson et al. | 380/49 |
| 6,047,376 | A | 4/2000 | Hosoe | 713/201 |
| 6,065,980 | A | 5/2000 | Leung et al. | 439/92 |
| 6,073,176 | A * | 6/2000 | Baindur et al. | 709/227 |
| 6,081,419 | A | 6/2000 | Pham | 361/617 |
| 6,091,951 | A | 7/2000 | Sturniolo et al. | 455/432 |
| 6,092,196 | A | 7/2000 | Reiche | 713/200 |
| 6,094,437 | A * | 7/2000 | Loehndorf et al. | 370/420 |
| 6,118,785 | A * | 9/2000 | Araujo et al. | 370/401 |
| 6,119,160 | A | 9/2000 | Zhang et al. | 709/224 |
| 6,141,687 | A | 10/2000 | Blair | 709/225 |
| 6,278,532 | B1 * | 8/2001 | Heimendinger et al. | 358/442 |
| 6,452,920 | B1 * | 9/2002 | Comstock | 370/349 |
| 6,614,809 | B1 * | 9/2003 | Verma et al. | 370/469 |
| 6,628,671 | B1 * | 9/2003 | Dynarski et al. | 370/469 |
| 6,763,018 | B1 * | 7/2004 | Puthiyandyil et al. | 370/352 |

OTHER PUBLICATIONS

Cisco 6400 Access Concentrators, printed from http://www.cisco.com/warp.public/cc/pd/as 6400/index.shtml on Sep. 27, 2000.

Cisco 6400 Universal Access Concentrator, Data Sheet, printed from http://www.cisco.com/warp.public.cc.pd.as.6400.prodlit/6400_ds.htm on Sep. 27, 2000.

Cisco 6400 Universal Access Concentrator, Product Bulletin—No. 1120, printed from http://www.cisco.com/warp.public.cc.pd.as.6400.prodlit/1120_pp.htm on Oct. 4, 2000.

Cisco Asymmetric Digital Subscriber Line Services Architecture, White Paper, printed from http://www.cisco.com.warp.public/cc/so/neso/dsso/global/ads1_wp.htm on Sep. 27, 2000.

"Cisco User Control Point", pp. 1-4, printed from http://www.cisco.com/warp/public/728/ucp ds.htm on Sep. 10, 1998.

"IBM Introduces New Subscriber Management System for Internet Service Providers", Dec. 2, 1998, IBM Corporation, printed from http://www.cisco.com/univercd/cc/td/doc/products/software/ios113ed/113t/113t3/ispec.

"IPSec Network Security", pp. 1-69, printed from http://www.cisco.com/univercd/cc/td/doc/products/software/ios113ed/113t/113t3/ipsec.

Layer 2 Tunnel Protocol, Release 12.0(1)T and 11.3(5)AA.

"L2TP", 1998, Mecklermedia Corporation, printed from http://www/webopedia.internet.com/TERM/L/L2TP/html.

"MultiVPN from Ascend Communications: Breaking Down the Barriers to VPNs", Ascend Communications, Inc., White Paper, 1998.

Patel, B., et al., "Securing L2TP using IPSEC", May 1998, PPPEXT Working Group, pp. 1-10, printed from http://www.masinter.net/~12tp/ftp/draft-ietf-pppext-12tp-security-02.txt.on Sep. 21, 1998.

Perkins, D., "Requirements for an Internet Standard Point-to-Point Protocol", Dec. 1993, Network Working Group.

"Point-to-Point Protocol", 1996, Ray Smith, printed from http://www.rjsmith.com/ppp.html on Sep. 23, 1998.

Rosen, et al., "Multiprotocol Label Switching Architecture", Apr. 1999, Network Working Group, Internet-Draft, pp. 1-62.

Simpson, W., "The Point-to-Point Protocol (PPP)", Dec. 1993, Network Working Group.

Tunneling, 1998, Meckermedia Corporation, printed from http://webopedia.internet.com/TERM/t/tunneling.html.

Valencia et al., "Layer Two Tunneling Protocol "L2TP"", printed from http://masinter.net/~12tp/ftp/draft-ietf-pppext-12tp-11.txt on Sep. 12, 1998.

Carrel, D. et al., The TACACS+ Protocol, Version 1.78, Cisco Systems, Inc., printed from ftp://ftp-eng.cisco.com/edweber/tac-rfc.1.78.txt on Oct. 23, 2000.

* cited by examiner

Forwarding Information Base

36

| Network Address | Interface/Connection | |
|---|---|---|
| 10.1.1.1 | $IDB_1$ (Access) | user@CompanyA |
| 0.0.0.0 | $IDB_2$ (L2TP) | Default |
| 10.x.x.x | $IDB_2$ (L2TP) | www.CompanyA |
| 134.x.x.x | $IDB_3$ (IP) | www.ISP-B |
| 127.x.x.x | $IDB_4$ (IP) | www.ISP-C |

METHOD AND SYSTEM FOR PROVIDING NETWORK ACCESS TO PPP CLIENTS

FIELD OF THE INVENTION

The present invention relates to the field of network communications. More specifically, the present invention relates to a method and apparatus for providing computer network access to PPP clients.

The Background Art

Computer networking capabilities of a home personal computer (PC) are typically provided by telephone companies (Telcos) or commercial Internet Service Providers (ISPs) who operate network access points along the information superhighway. It is through these network access points that the user is able to connect with public domains, such as the Internet, and private domains, such as an intra-company computer network of the user's employer.

In wholesale Internet access environment, the network access provider (NAP) and the network service provider (NSP) are not necessarily the same entity. Telcos and other wholesale ISPs are typical NAPs, who operate gateways (network access servers, access routers, or the like) in their points of presence (PoPs), and provide local loop access services to PCs. NSPs are typically the customers of NAPs, who are allowed to use the NAPs' gateways to provide their IP-based services, such as Internet access, network access, or voice over IP (VoIP) services to the PCs.

FIG. 1 illustrates two types of common service architectures for PPP clients currently available at NAPs. One is Point-to-Point Protocol (PPP) tunneling, typically using the Layer 2 Tunneling Protocol (L2TP) or Layer 2 Forwarding (L2F), and the other is IP-based forwarding such as Point-to-Point Protocol Terminated Aggregation (PTA), which terminates PPP sessions at the NAP and forwards IP frames.

In the typical L2TP tunneling, a PC 1 of a PPP client starts a PPP session by dialing into a network access server (NAS) 2 located at the NAP's point of presence (PoP). The NAS 2 exchanges PPP messages with the client's PC 1 and communicates with a L2TP network server (LNS) 4 of an ISP or a private company. The LNS 4 is typically a home gateway (HGW) of the ISP or company's network. The communication between the NAS 2 and the LNS 4 is by way of L2TP requests and responses. When a L2TP tunnel 6 is set up, the NAS 2 forwards the PPP session over the L2TP tunnel 6 to the LNS 4. Data packets in the PPP session are encapsulated into L2TP frames that are destined for the IP address of the LNS 4.

The LNS 4 is a termination point of the L2TP tunnel 6. The LNS 4 accepts these L2TP frames, strips the L2TP encapsulation, and processes the incoming PPP frames for the appropriate interface. The PPP frames are processed and passed to higher layer protocols, i.e., the PPP session is terminated at the LNS 4. The PPP session termination requires and includes user authentication via a Remote Authentication Dial-In User Service (RADIUS) or other means. An authenticated PPP client then receives an IP address, a Domain Name System (DNS) address, and IP-based services that the client contracted. These are forwarded back to the client over the L2TP tunnel 6 through the NAS 2.

The L2TP passes protocol-level (or Data Link-level) packets through the virtual tunnel between the endpoints of a point-to-point connection, i.e., the client's PC 1 and the LNS 4. The L2TP is suitable for virtual private networking (VPN), in which users can dial into a NAP's network access server and join a private (typically corporate) network that is remote from the NAS's PoP. Since the L2TP does not examine the destination IP address (the IP address in the private network), L2TP tunneling supports multiple IP address handling that is required for VPN. The L2TP is also suitable when the NAP does not bundle Internet access to its services or does not want to manage IP.

However, as NAPs, especially Telcos, are facing increasing competitive pressure to lower pricing on their wholesale services, and ISPs are providing voice and video services over IP, Telcos are battling to enter IP-based service markets. The current PPP forwarding based on the tunneling technology, however, deprives the possibility for Telcos to offer IP-based services to their PPP clients, since the Telcos do not terminate PPP sessions and thus cannot touch IP frames.

On the other hand, the other service architecture, typically the PPP Terminated Aggregation (PTA), allows Telcos to provide IP-based services to their PPP clients. In the typical PTA, a NAP terminates PPP sessions from PCs and then forwards IP traffic to its destination via a PVC/ATM connection, as shown in FIG. 1. Currently, it is possible for the NAP's single NAS 2 to provide both L2TP and PTA services, and let NSPs to choose the service they prefer. Thus, by coordinating with NSPs, Telcos are able to provide IP-based services to its PPP clients. However, once a NSP chooses the L2TP service from the NAP, the NAP has no means to provide IP-based services to PPP clients who are accessing the NSP. Since PPP clients are typically subscribers of the NSP's services and thus "owned" by the NSP, this is the most likely scenario.

Furthermore, in a situation where a NAP offers both L2TP and PTA services, there still remains inconvenience for users to select the services in the PPP-based network access. In order to select another service from the NAS 2, such as connection to a HGW 8 of a different network, the PPP client must terminate the existing PPP session and establish a new PPP connection to the NAS 2, since The L2TP connects a PPP client only to a single destination LNS 4.

BRIEF DESCRIPTION OF THE INVENTION

A method provides computer network access to PPP clients. The method includes (a) receiving a PPP session creation request from a client, the PPP session creation request including a control protocol frame encapsulated therein, (b) obtaining user domain information associated with the PPP session creation request, (c) setting up a Layer 2 tunnel according to a parameter contained in the control protocol frame, (d) creating an ingress PPP object associated with an incoming PPP session, a host object associated with the client, and an egress PPP object associated with the Layer 2 tunnel, (e) creating an egress IP object based upon obtained user domain information, the egress IP object associated with IP-based forwarding, (f) linking the ingress PPP object, the host object, and the egress PPP object, thereby forwarding data packets from a PPP session with the client over the Layer 2 tunnel, and (g) linking the host object and the egress IP object, thereby forwarding IP frames received from the client over a link other than the Layer 2 tunnel.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Embodiments of the present invention are described herein in the context of a method and system for providing network access to PPP clients. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

Figure 1:
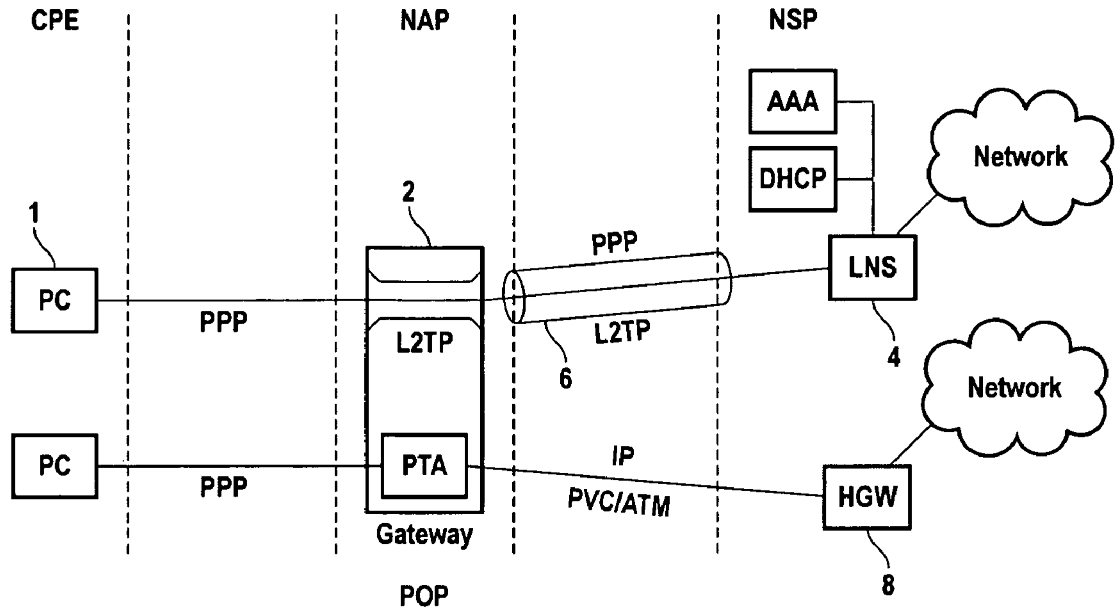
FIG. 1 is a diagram schematically illustrating two types of common service architectures for PPP clients currently available at NAPs.
Figure 2:
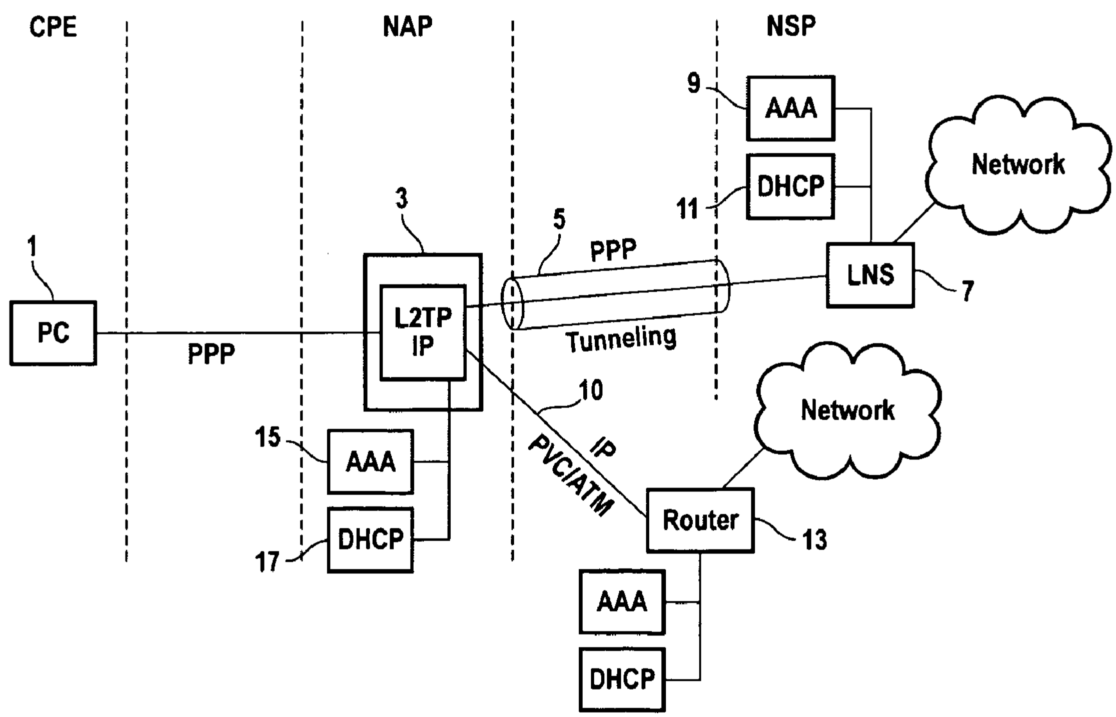
FIG. 2 is a diagram schematically illustrating an architecture providing computer network access to PPP clients according to a presently preferred embodiment of the present invention.

FIG. 2 schematically illustrates an exemplary PPP forwarding and IP forwarding architecture according to a presently preferred embodiment of the present invention. A PPP client (PC) 1 first starts a PPP session, for example, by dialing into a NAP's network access device 3. The network access device 3 is capable of forwarding a PPP session with the client 1 to a L2TP Network Server (LNS) 7 over a L2TP or L2F tunnel 5. The network access device 3 is also capable of forwarding IP frames received from the PPP client 1 over a link 10 other than the Layer 2 tunnel 5.

The LNS 7 is typically a home gateway (HGW) of a network of a NSP, for example, an ISP or a private company. Receiving the PPP session, the LNS 7 terminates the PPP session, i.e., extracts the IP frame, examines the IP address, and provides IP-based services to the PC. In order to provide authentication for the clients, the LNS 7 may include or be coupled with an Authentication, Authorization, and Accounting (AAA) server 9 using Remote Authentication Dial-In User Service (RADIUS), Terminal Access Concentrator Access Control Server PLUS (TACACS+), or the like. The LNS 7 may also include or be coupled with a Dynamic Host Configuration Protocol (DHCP) server 11 that dynamically allocates an IP address to the client 1. Although the network access device 3 may also be coupled with an AAA server 15 and a DHCP server 17, it is typically for the NSP to authenticate the PPP client 1 and to provide an IP address to the client 1 when the PPP session of the client 1 is forwarded over the L2TP tunnel 5.

At the same time as forwarding the PPP session over the L2TP tunnel 5, the network access device 3 acts on the PPP session and enables the NAP to provide additional IP-based services to the PPP client 1. Such additional IP-based services may include access to another network, voice-over-IP (VoIP), video services over IP, and the like, via the link 10 other than the L2TP tunnel 5. The link 10 may be a permanent virtual circuit (PVC), asynchronous transfer mode (ATM) circuit, or the like, connecting to a router 13. The router 13 may be a HGW of a network, an edge router of a core network, a first router giving a hop to the backbone network, or the like. The IP frame forwarding is based on IP, or a protocol based on Layer 3 or higher. The PPP client 1 does not have to terminate the current PPP session in order to obtain IP-based services via the link 10. Additionally, the network access device 3 may authenticate and/or provide an IP address to the same PPP client 1, if necessary, using the AAA server 15 and/or the DHCP server 17.

Figure 3:
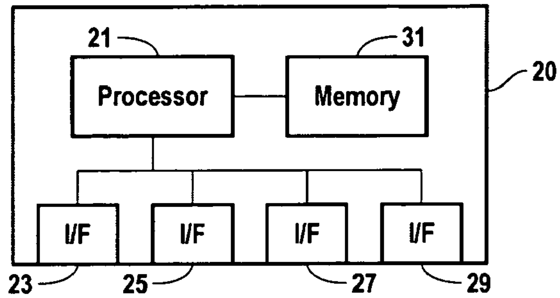
FIG. 3 is a diagram schematically illustrating an apparatus for providing computer network access according to a presently preferred embodiment of the present invention.

FIG. 3 schematically illustrates an apparatus 20 for providing network access according to a presently preferred embodiment of the present invention. The apparatus 20 may be an access concentrator, an access router, or a similar network access device. For example, the present invention will be implemented in a Cisco 6400 Series Access Concentrator, available from Cisco Systems, Inc. of San Jose, Calif.

As shown in FIG. 3, the apparatus 20 includes a processor 21, a memory 31, a first interface 23 for receiving a PPP session (PPP session receiving interface 23), a second interface 25 for forwarding PPP session frames over a Layer 2 tunnel (Layer 2 tunneling interface 25), a third interface 27 for forwarding IP frames over a link other than the Layer 2 tunnel (IP frame forwarding interface 27). The apparatus 20 may also include one or more additional interface 29 to provide additional links. The processor 21 controls interfaces 23–29 and the memory 31, and performs forwarding and routing operation for data packets, including decapsulation and encapsulation.

Figure 4:
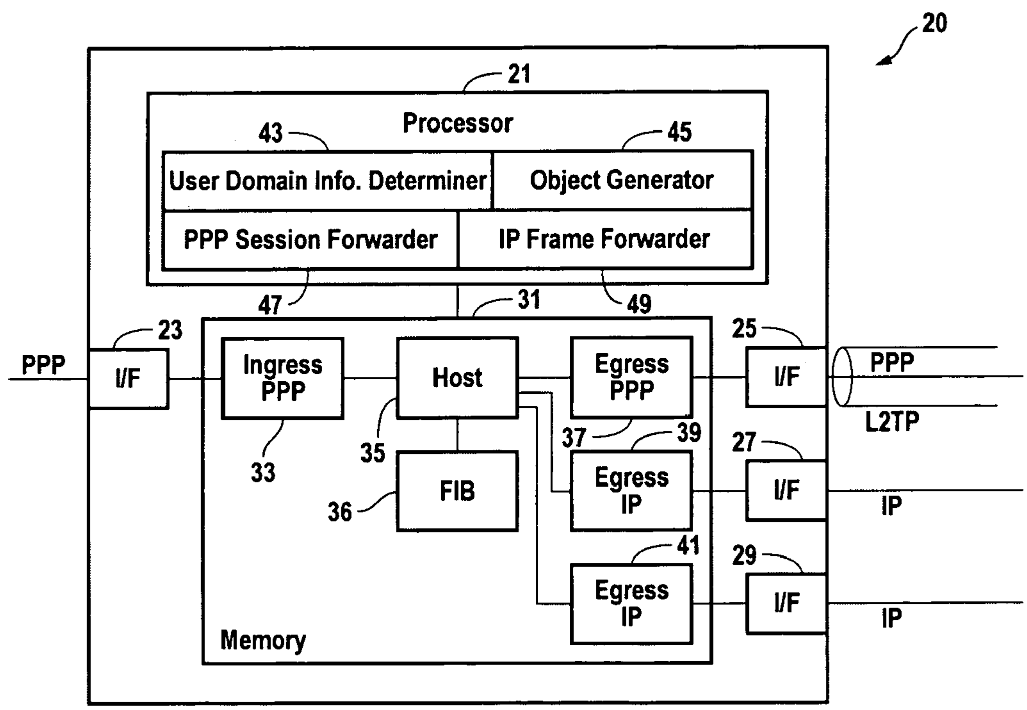
FIG. 4 is a block diagram schematically illustrating an apparatus for providing computer network access according to a presently preferred embodiment of the present invention.

FIG. 4 schematically illustrates the more detailed structure of the apparatus 20 according to a presently preferred embodiment of the present invention. The memory 31 contains an ingress PPP object 33 associated with the PPP session receiving interface 23, a host object 35 associated with the PPP client who is requesting network access, an egress PPP object 37 associated with the Layer 2 tunneling interface 25, and an egress IP object 39 associated with the IP frame forwarding interface 27. The memory 31 may also contain additional egress IP object 41 associated with the additional IP frame forwarding interface 29. In addition, the memory 31 may contain a forwarding information base (FIB) 36 associated with the host object 35.

The processor 21 includes a user domain information determiner 43, an object generator 45, a PPP session forwarder 47, and an IP frame forwarder 49. They may be implemented as components of the software running on the processor 21.

Figure 5:
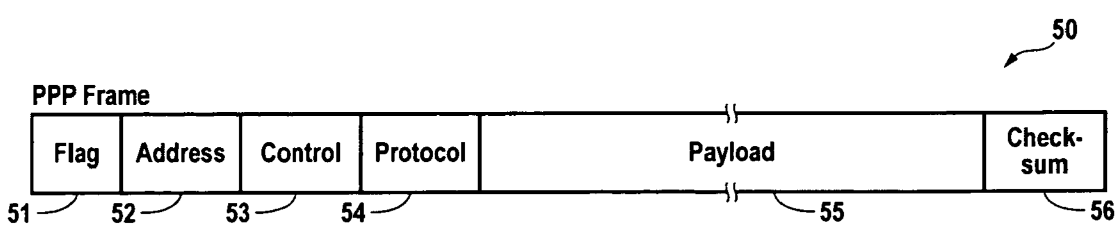
FIG. 5 is a diagram schematically illustrating a typical data field format of a PPP frame.

Typically, in order to access a network through a network access device, a PPP client first makes a PPP session creation request, i.e., sends a data packet in a PPP frame. FIG. 5 illustrates an exemplary frame format of a PPP frame 50 as is well known to those of ordinary skill in the art. The PPP frame 50 includes Flag field 51, Address field 52, Control field 53, Protocol field 54, Payload field 55, and Checksum field 56.

The Flag field 51 contains the standard High-level Data Link Control (HDLC) flag byte (01111110). The Address field 52 is set to the binary value 11111111 to indicate that all stations are to accept the frame. Using this binary value avoids the issue of having to assign data link address. The Control field 53 has the default value of 00000011, indicating an unnumbered frame. Since the Address field 52 and Control field 53 are always constant in the default configuration, the Link Control Protocol (LCP) provides the necessary mechanism for two parties to negotiate an option to just omit them to save 2 bytes per frame. The Protocol field 54 indicates what kind of packet is in the Payload field 55. Codes are defined for the LCP, Network Control Protocol (NCP), IP, IPX, AppleTalk, and other protocols. Protocols starting with a "0" bit are network layer protocol such as IP, IPX, OSI CLMP, and XNS. Those starting with a "1" bit are used to negotiate other protocols. These include LCP and a different NCP for each network layer protocol supported. The default size of the Protocol field 54 is 2 bytes, but it can be negotiated down to 1 byte using LCP. The Payload field 55 has variable length, up to some negotiated maximum. If the length is not negotiated using LCP during the line set up, a default length of 1500 bytes is used. Padding may follow the payload, if necessary. After the Payload field 55 comes the Checksum field 56, which is normally 2 bytes, but a 4-byte checksum can be negotiated.

The user domain information determiner 43 obtains user domain information associated with the PPP session creation request. The user domain information indicates how to proceed with the PPP session and where to connect the PPP client. The user domain information may be obtained from the PPP session creation request. For example, a PPP client typically uses a structured username in order to access the network, such as "usrname@domain." The user domain information determiner 43 looks up a service profile that matches the "domain" string. The service profile may be stored locally in the apparatus 20, or a server such as a RADIUS server. The matching service profile may contain the IP address of the LNS and a password for the L2TP tunnel. Alternatively, the matching profile may contain the IP address of a HGW of an ISP to which services the client subscribes.

In addition, the user domain information may be obtained from user identification information associated with a physical connection of the PPP session creation request, such as a line number (or telephone number) used by the client for transmitting the PPP session creation request. For example, if the NAP operating the apparatus 20 (or network access device 3 in FIG. 2) has contracted with Company A to provide private virtual networking between Company A and its branch, a specific phone number (or "caller ID") of the branch can be used to determine where to connect the client. In this case, a service profile contains the line/phone number or VPI/VCI number and provides an IP address of the LNS of Company A.

Furthermore, such user identification information or user specific information may be associated with a physical location of the client, client's PC, or the client premises equipment. For example, a specific line may be allocated to the premises of the branch of Company A.

The object generator 45 creates in the memory 31 the various objects described above. The object generator 45 creates the egress PPP object 37 and the egress IP object 39 based upon the user domain information obtained by the user domain information determiner 43. For example, if a user attempts to access a network from his/her workplace; a company's branch, the line ID information of the PPP session creation request may indicate a connection to a LNS of the private company, while the "domain" string of the username may indicate a HGW of an ISP, which is not a LNS. The object generator 45 creates the egress PPP object 37 for the connection to the company's LNS, and the egress IP object 39 for the connection to the ISP's HGW. The object generator 45 may create the egress PPP object 37 as a default connection regardless of the determination of the user domain information determiner 43.

The PPP session forwarder 47 is responsible for Layer 2 forwarding. The PPP session forwarder 47 sets up a Layer 2 tunnel according to a parameter contained in the control protocol frame of the PPP session creation request. Such a setup may include forwarding LCP negotiations with the PPP client to the LNS. After the object generator 45 creates the objects, the PPP session forwarder links the ingress PPP object 33, the host object 35, and the egress PPP object 37, thereby forwarding data packets from the PPP session with the client via the Layer 2 tunneling interface 25.

The PPP session forwarder 47 may include an IP address forwarder (not shown in FIG. 4). As described above, the LNS 7 (in FIG. 2) typically assigns an IP address to the authenticated PPP client and sends it to the network access device 3 through the Layer 2 tunnel 5. The IP address forwarder receives the IP address and transfers it to the PPP client.

The IP frame forwarder 49 is responsible for IP frame forwarding. It links the host object 35 and the egress IP object 39, thereby forwarding IP frames received from the client via the IP frame forwarding interface 27. The IP frames are forwarded through the IP frame forwarding interface 27 over a link other than the Layer 2 tunnel, for example, a PVC or ATM.

Figures 6, 7:
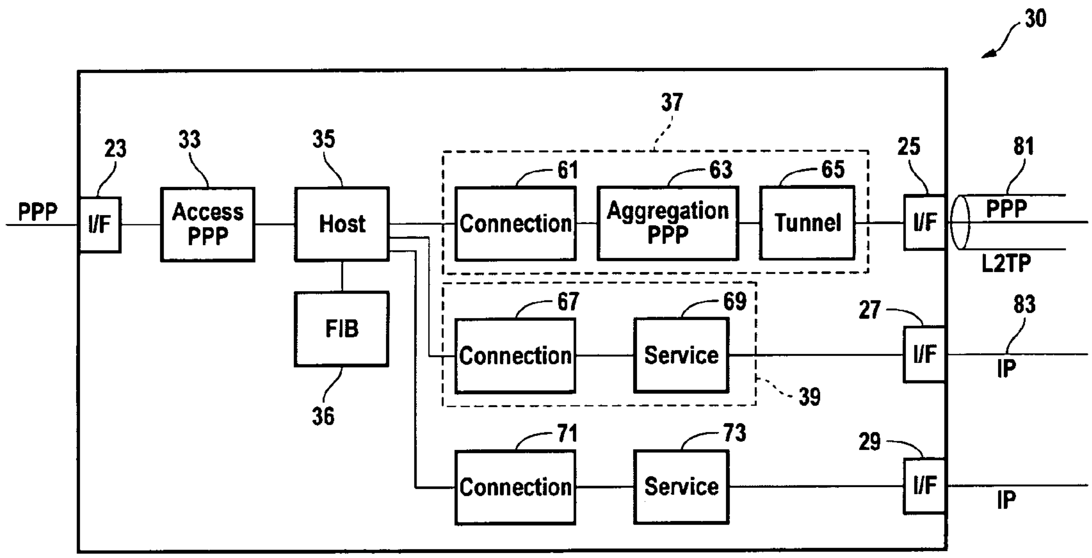
FIG. 6 is a block diagram schematically illustrating an apparatus for providing computer network access according to a presently preferred embodiment of the present invention.
FIG. 7 is a diagram illustrating an example of a forwarding information base.

FIG. 6 schematically illustrates an apparatus 30 for providing network access according to a presently preferred embodiment of the present invention. In FIG. 6, the like elements are indicated by the like reference numerals as those in FIG. 4. In the apparatus 30, the objects have more detailed structure and the egress PPP object 43 and the egress IP object 45 includes multiple objects.

An access PPP object (i.e., ingress PPP object) 33 is associated with a PPP connection with the client via the first interface 23. The egress PPP object 37 includes a connection object 61, an aggregation PPP object 63, and a tunnel object 65. The connection object 61 contains a range of IP addresses. The aggregation PPP object 63 is associated with outgoing PPP frames. The tunnel object 65 is associated with Layer 2 tunneling through the second interface 25. Similarly, the egress IP object 39 includes a connection object 67 that contains a range of IP addresses, and a service object 69 associated with IP frame forwarding through the third interface 27.

The connection objects 61 and 67 are created according to the obtained user domain information. The connection object 61 may be created as the default connection. If the user domain information of the PPP client indicates yet another possible connection to a different network, the corresponding connection object 71 and the service object 73 may be created during the setup stage, as shown in FIG. 6.

The PPP session is forwarded by making a link through the access PPP object 33, the host object 35, the connection object 61, the aggregation PPP object 63, and the tunnel object 65, via the second interface 25 over the Layer 2 tunnel 81 to a LNS. When the PPP client wants to connect to a network through an IP-based link 83, the host object 35, the connection object 67, and the service object 69 are linked. The IP frames from the PPP client are forwarded via the third interface 27. If the PPP client wants to connect to yet another network, the host object 35, the connection object 71, and the service object 73 may be linked through and IP frames from the PPP client is forwarded via the fourth interface 29.

FIG. 7 illustrates an example of the FIB 36. The FIB 36 contains associations between a network address and an interface descriptor block (IDB) indicating a connection to the corresponding interface. For example, such associations include one between the PPP client's IP address (public or assigned) and the ingress/access PPP object 33 that indicating connection to the PPP session receiving interface (the first interface) 23. For example, if the PPP client is an employee of Company A, such network address may be 10.1.1.1, or the PPP client is a user/subscriber of an ISP (ISP-B), such network address may be 134.1.1.1.

The FIB 36 also includes an association between a default network address (i.e., 0.0.0.0) and the egress PPP object 37 (or the connection object 61). This means that even if there is no matching destination IP address in the FIB 36, the FIB 36 still provides a link to the connection object 61 (or egress PPP object 37). Thus, the PPP session from the PPP client can be forwarded over the L2TP tunnel 81 without looking for the destination IP address.

When the PPP client is an employee of Company A which has contracted PPP forwarding over the Layer 2 tunnel, the FIB 36 may also include an association between the Company's network address (for example, 10. x. x. x) and an IDB indicating the corresponding interface directing to the destination network (for example, the connection object 61 associated with the Layer 2 tunneling interface 25). In addition, the FIB 36 may include another association between a network address (for example, ISP-B's network: 134. x. x. x) and an IDB indicating the corresponding interface directing to the ISP's network (for example, the connection object 67 associated with the IP frame forwarding interface 27. The FIB 36 may further include yet another association between another network address (for example, 127. x. x. x) and an IDB indicating another IP frame forwarding interface 29, if the user domain information suggests such additional connection. Any number of connection objects may be created for one PPP client, i.e., for one host object.

According to a presently preferred embodiment of the present invention, the FIB 36 is stored in a form of a hash table. The key is the network address, and values are the various objects. By default, the FIB 36 contains entries for the ingress/access PPP object 33 and connection object 61 (egress PPP object 37).

Figure 8:
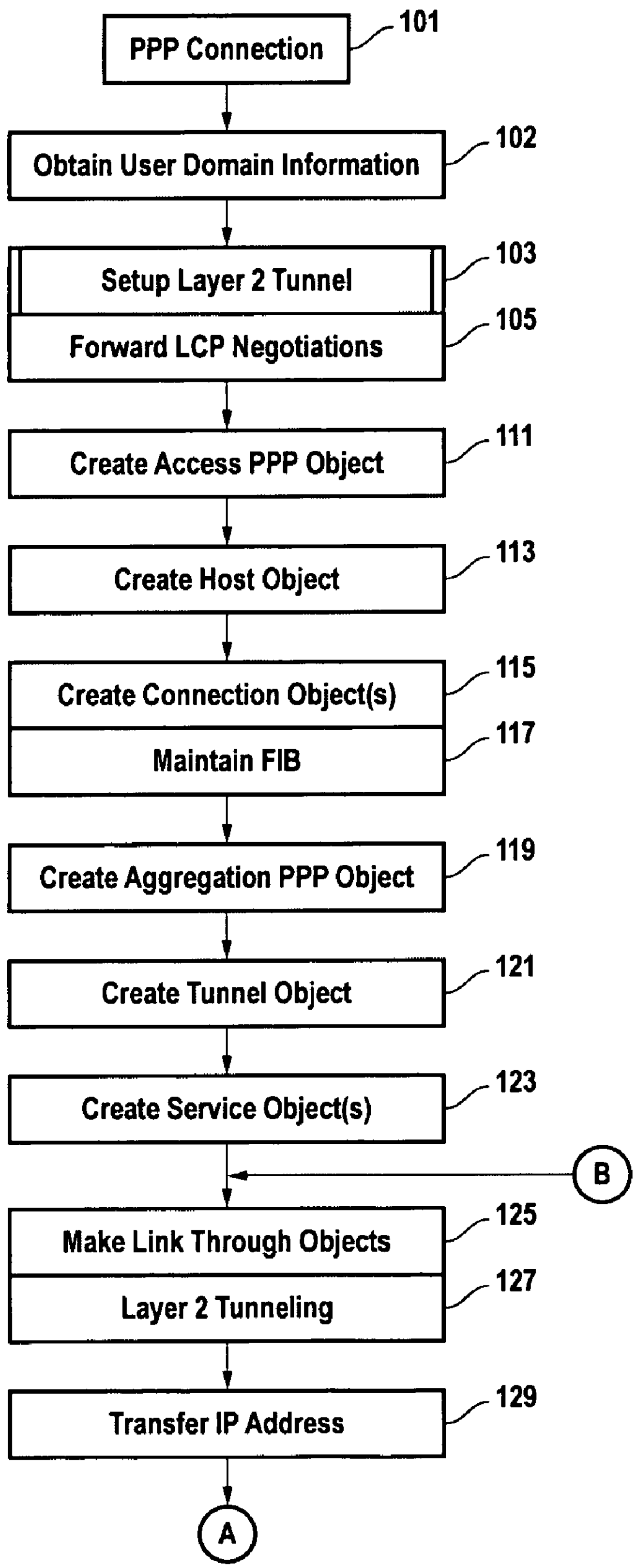
FIG. 8 is process flow diagram illustrating a method for providing computer network access according to a presently preferred embodiment of the present invention.

FIG. 8 is a process flow diagram schematically illustrates a method of providing computer network access according to a presently preferred embodiment of the present invention. FIG. 6 is also referred to for explanatory purposes but by no means for intent of limitation. The following description, the method of the present invention may be performed by a network access device such as the apparatuses 20 as well as the apparatus 30. Furthermore, the method of the present invention may be implemented in a product, device, or collection of devices and software products, and performed by a network access server, network access device, or aggregation device capable of such performance.

As shown in FIG. 8, a user (PPP client) initiates a PPP connection to a network access device, using an analog telephone system, integrated services digital network (ISDN), or the like. The network access device accepts the connection at the PoP, and the PPP link is established between the user and the network access device (101). The network access device receives a PPP session creation request from the user, and the user domain information, as described above, is obtained (102). Some information relevant to the user domain information (such as domain name and/or dial number ID) may be obtained during the partial authentication of the client for setting up the Layer 2 tunnel for the client.

The regular L2TP tunnel setup process is performed according to a parameter contained in the control protocol frame of the PPP session creation request (103). For example, after the PPP link with the client is established, the network access device partially authenticates the PPP client using the Challenge Handshake Authentication Protocol (CHAP), the Password Authentication Protocol (PAP), or the like. The username, domain name, or Dial Number Identification Service (DNIS) is used to determine whether the user is a PPP client for Layer 2 tunneling (L2TP client), such as a Virtual Private Dialup Networking (VPDN) client. If the user is not a L2TP client, authentication may continue, and the client will access the Internet or other contracted services. If the user is a L2TP client, tunnel information such as a tunnel password, tunnel type, the LNS' IP address, and the like, is obtained from a service profile. Such a service profile may be locally stored in the network access device or stored in a RADIUS server.

The tunnel end points, the network access device and the LNS, may authenticate each other before any sessions are forwarded over a tunnel. Alternatively, the LNS can accept tunnel creation without any tunnel authentication of the network access device. Once the tunnel exists, a L2TP tunnel session is created for the client.

The network access device may forward the LCP negotiations (LCP negotiated options) and the partially authenticated CHAP/PAP information to the LNS (105). The LNS will funnel the negotiated options and authentication information directly to the virtual access interface. If the options configured on the virtual interface does not match the negotiated options with the network access device, the connection will fail, and a disconnect message is sent to the network access device.

Then, the network access device creates an access PPP object 33 (111), a host object 35 (113), one or more connection objects 61, 67 and/or 71 (115), an aggregation PPP object 63 (119), a tunnel object 65 (121), and one or more service objects 69 and/or 73 (123). As described above, these objects are created based on the information obtained through setup of the Layer 2 tunnel, including the partial authentication information and the user domain information. These various objects are created as object-oriented database structure during the setup or control stage of the Layer 2 tunneling.

Creating connection objects may include maintaining a forwarding information base (FIB) 36 for the host object 35 (117). As discussed above, the FIB 36 contains associations between network addresses and interface descriptor blocks (or objects) corresponding to the links.

Once the Layer 2 tunnel is setup and a necessary link is established, the LNS typically assigns an IP address to an authenticated client, and sends it to the network access device over the Layer 2 tunnel. The network access device receives the IP address and transfers it to the client (129).

Then, in the forwarding stage, the network access device makes a process link through the access PPP object 33, the host object 35, the connection object 61, the aggregation PPP object 63, and the tunnel object 65 (125). Data packets from the PPP session (PPP frames) are forwarded through the Layer 2 tunneling interface 25 (127). An outgoing PPP frame is encapsulated in a L2TP frame and forwarded to the LNS over the Layer 2 tunnel 81.

Figure 9:
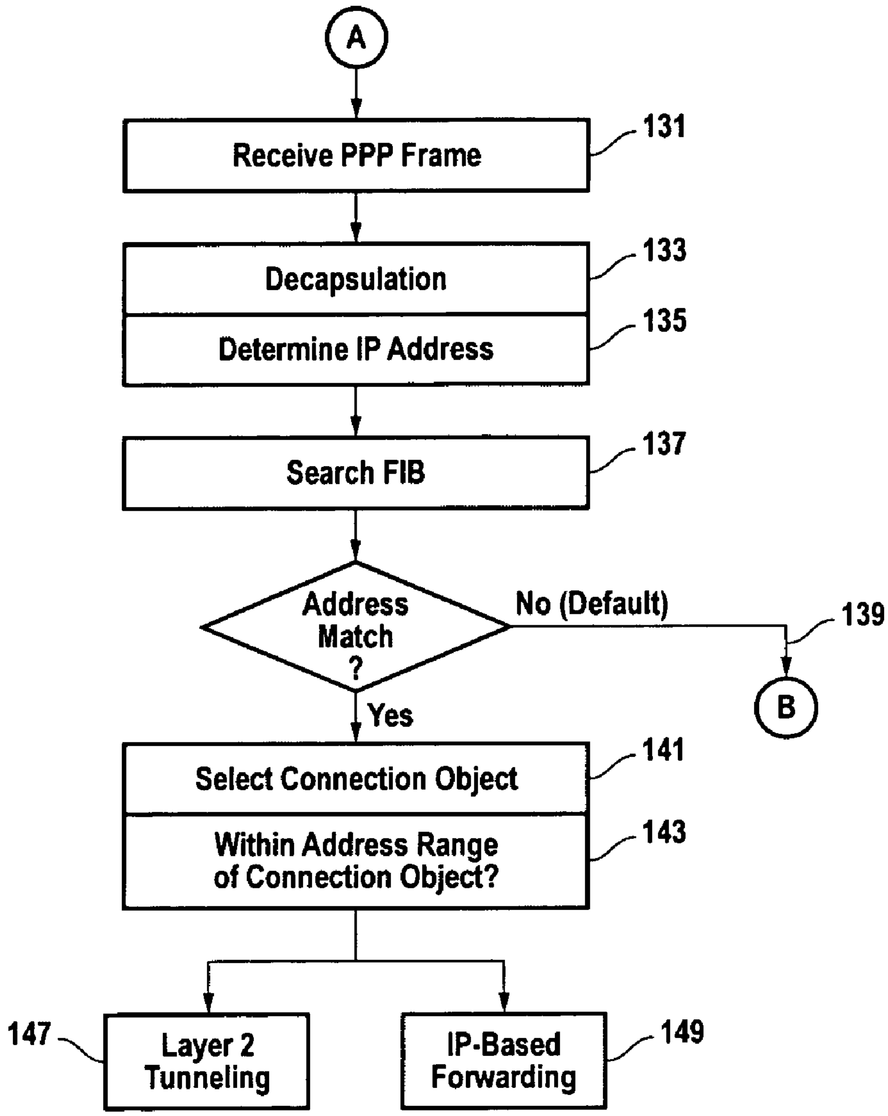
FIG. 9 is process flow diagram illustrating a method for providing computer network access according to a presently preferred embodiment of the present invention.

As shown in FIG. 9, in the PPP session, the network access device receives succeeding PPP frames from the client (131). Through decapsulation, the network access device examines the PPP frames (133) and determines destination IP address of the data packets (135). The FIB 36 is searched for a matching IP address (137). If there is no matching address other than the default link, the data packets are remain forwarded through the same link over the Layer 2 tunnel (139).

When the destination IP address matches to one network address on the FIB 36, the network access device select one of the connection object (141). Each connection object has a certain range of IP addresses and the network access device looks up the connection object to determine whether the destination IP address is within the IP address range of the connection object (143). For example, when the client attempts to access a different server within the same network that the client is currently connecting through the Layer 2 tunnel, the connection object 61 remains the same even though the destination IP address changes. The network access device forwards the data packet through the existing link over the Layer 2 tunnel (147). The data packet (PPP frame) is encapsulated into a L2TP frame and sent to the LNS.

When the destination IP address is not within the range of the connection object 61, but within the address range of the connection object 67, for example, the PPP client is attempting to access a different network through a link 83 other than the Layer 2 tunnel 81. Thus, the network access device uses the corresponding link through the selected connection object 67. That is, the network access device forwards the data packets (IP frames) using the link though the host object 35, the connection object 67, the service object 69, and the IP frame forwarding interface 27 (149). The IP frames are forwarded to a router for IP-based forwarding/routing. It should be noted that the possible links for the PPP client have been established in the setup stage described above, and in the forwarding stage, the network device uses one of the links in accordance with the selected connection object.

Through this IP-based link 83 or another, the NAS is allowed to provide IP based to services to the PPP client. The link 83 or 85 may be coupled to any router, server, or other network device to provide such services. For example, NAS may provide web-based service selection to the client, voice or video over IP, and the like.

As described above, the PPP client who has connected to a network via Layer 2 tunneling can access another network though IP-based connection without terminating the existing PPP session. The NAP can also provide IP-based services to the PPP client through a link other than the Layer 2 tunnel without impairing the L2TP access services for the PPP client and the LNS.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for providing computer network access, comprising:

receiving a PPP session creation request from a client, said PPP session creation request including a control protocol frame encapsulated therein;

obtaining user domain information associated with said PPP session creation request;

setting up a Layer 2 tunnel for said client according to a parameter contained in said control protocol frame;

creating an ingress PPP object associated with an incoming PPP session, a host object associated with said client, and an egress PPP object associated with said Layer 2 tunnel;

creating an egress IP object based upon obtained user domain information, said egress IP object associated with IP-based forwarding;

linking said ingress PPP object, said host object, and said egress PPP object, thereby forwarding data packets from a PPP session with said client over said Layer 2 tunnel; and linking said host object and said egress IP object, thereby forwarding IP frames received from said client over a link other than said Layer 2 tunnel.

2. The method according to claim 1, wherein said setting up includes forwarding control protocol negotiations.

3. The method according to claim 1, further including:

receiving an IP address through said Layer 2 tunnel, said IP address having been assigned to said client; and transferring said IP address to said client.

4. The method according to claim 1, wherein said user domain information is obtained from said PPP session creation request.

5. The method according to claim 1, wherein said user domain information is obtained using a user profile.

6. The method according to claim 1, wherein said user domain information is obtained from user identification information associated with a physical connection of said PPP session creation request.

7. The method according to claim 6, wherein said user domain information is obtained from a line number used by said client for transmitting said PPP session creation request.

8. The method according to claim 1, wherein said user domain information is obtained from user identification information associated with a physical location of said client.

9. The method according to claim 1, further comprising:

maintaining a forwarding information base for said host object, said forwarding information base containing at least one association between a network address and either said ingress PPP object or said egress PPP object.

10. The method according to claim 9, wherein said forwarding information base includes a default link to said egress PPP object.

11. The method according to claim 9, wherein said forwarding information base is stored in the form of a hash table.

12. The method according to claim 1, wherein said creating an ingress PPP object includes creating an access PPP object associated with a PPP connection to said client via a first interface.

13. The method according to claim 12, wherein said creating an egress PPP object includes:

creating a first connection object containing a range of IP addresses;

creating an aggregation PPP object associated with outgoing PPP frames; and creating a tunnel object associated with Layer 2 tunneling through a second interface.

14. The method according to claim 13, wherein said first connection object includes a list of network addresses.

15. The method according to claim 13, wherein said creating an egress IP object includes:

creating a second connection object containing a range of IP addresses; and creating a service object associated with IP frame forwarding through a third interface.

16. The method according to claim 15, wherein said second connection object includes a list of network addresses.

17. The method according to claim 15, further comprising maintaining a forwarding information base for said host object, said forwarding information base containing:

an association between said access PPP object and an address of said client; and a default link to said aggregation PPP object.

18. The method according to claim 17, wherein said creating said first connection object includes adding into said forwarding information base an association between said aggregation PPP object and a corresponding network address, and said creating said second connection object includes adding into said forwarding information base an association between said service object and a corresponding network address.

19. A network device for providing computer network access, said network device comprising:

a first interface for receiving a PPP session creation request from a client, said PPP session creation request including a control protocol frame encapsulated therein;

a second interface for forwarding data packets from a PPP session over a Layer 2 tunnel;

a third interface for forwarding IP frames over a link other than said Layer 2 tunnel;

a memory; and a processor coupled with said first interface, said second interface, said third interfaces, and said memory, said processor including:

a domain information determiner for obtaining user domain information associated with said PPP session creation request;

an object generator for creating objects in said memory, said object generator creating an ingress PPP object associated with an incoming PPP session, a host object associated with said client, an egress PPP object associated with Layer 2 tunneling through said second interface, and an egress IP object associated with IP-based forwarding through said third interface, said egress IP object being created based upon obtained user domain information;

a PPP session forwarder for setting up a Layer 2 tunnel for said client according to a parameter contained in said control protocol frame, and for linking said ingress PPP object, said host object, and said egress PPP object, thereby forwarding data packets from a PPP session with said client over said Layer 2 tunnel; and an IP frame forwarder for linking said host object and said egress IP object, thereby forwarding IP frames received from said client over a link other than said Layer 2 tunnel.

20. The network device according to claim 19, wherein said ingress PPP object includes an access PPP object associated with a PPP connection with said client via said first interface.

21. The network device according to claim 19, wherein said egress PPP object includes:

a PPP session connection object containing a range of IP addresses;

an aggregation PPP object associated with outgoing PPP frames; and a tunnel object associated with Layer 2 tunneling through said second interface.

22. The apparatus according to claim 19, wherein said egress IP object includes:

an IP frame connection object containing a range of IP addresses; and a service object associated with IP frame forwarding through said third interface.

23. The network device according to claim 19, wherein said PPP session forwarder forwards control protocol negotiations when setting up said Layer 2 tunnel.

24. The network device according to claim 19, wherein said PPP session forwarder includes:

an IP address forwarder for receiving an IP address through said Layer 2 tunnel, said IP address having been assigned to said client, and for transferring said IP address to said client.

25. The network device according to claim 19, wherein said domain information determiner obtains said user domain information from said PPP session creation request.

26. The network device according to claim 19, wherein said domain information determiner obtains said user domain information using a service profile.

27. The network device according to claim 19, wherein said domain information determiner obtains said user domain information from user identification information associated with a physical connection of said PPP session creation request.

28. The network device according to claim 27, wherein said domain information determiner obtains said user domain information from a line number used by said client for transmitting said PPP session creation request.

29. The network device according to claim 19, wherein said domain information determiner obtains said user domain information from user identification information associated with a physical location of said client.

30. The network device according to claim 19, further comprising:

a forwarding information base provided for said host object, said forwarding information base containing at least one association between a network address and either said ingress PPP object or said egress PPP object.

31. The network device according to claim 30, wherein said forwarding information base includes a default link to said egress PPP object.

32. The network device according to claim 30, wherein said forwarding information base is stored in the form of a hash table.

33. An apparatus for providing computer network access, said apparatus comprising:

a PPP session receiving interface;

a PPP session Layer 2 tunneling interface;

an IP frame forwarding interface;

a memory, said memory containing:

an ingress PPP object associated with said PPP session receiving interface;

a host object associated with a client requesting network access;

an egress PPP object associated with said PPP session Layer 2 tunneling interface; and an egress IP object associated with said IP frame forwarding interface; and a processor coupled with said PPP session receiving interface, said PPP session Layer 2 tunneling interface, said IP frame forwarding interface, and said memory, said processor including:

a user domain information determiner;

an object generator responsive to said user domain information determiner;

a PPP session forwarder linking through said ingress PPP object, said host object, and said egress PPP object; and an IP frame forwarder linking through said host object and said egress IP object.

34. An apparatus according to claim 33, further comprising:

a forwarding information base associated with said host object, said forwarding information base containing at least one association between a network address and either said ingress PPP object or said egress PPP object.

35. The apparatus according to claim 34, wherein said forwarding information base is stored in the form of a hash table in said memory.

36. The apparatus according to claim 34, wherein said forwarding information base includes a default link to said egress PPP object.

37. The apparatus according to claim 36, wherein said forwarding information base further includes an association between said egress IP object and a corresponding network address.

38. The apparatus according to claim 33, wherein said ingress PPP object includes an access PPP object associated with a PPP connection to said client via said PPP session receiving interface.

39. The apparatus according to claim 33, wherein said egress PPP object includes:

a PPP session connection object containing a range of IP addresses;

an aggregation PPP object associated with outgoing PPP frames; and a tunnel object associated with Layer 2 tunneling through said PPP session Layer 2 tunneling interface.

40. The apparatus according to claim 33, wherein said egress IP object includes:

an IP frame connection object containing a second range of IP addresses; and a service object associated with IP frame forwarding through said IP frame forwarding interface.

41. A system for providing computer network access, comprising:

means for receiving a PPP session creation request from a client, said PPP session creation request including a control protocol frame encapsulated therein;

means for obtaining user domain information associated with said PPP session creation request;

means for setting up a Layer 2 tunnel for said client according to a parameter contained in said control protocol frame;

means for creating an ingress PPP object associated with an incoming PPP session, a host object associated with said client, an egress PPP object associated with said Layer 2 tunnel;

means for creating an egress IP object based upon obtained user domain information, said egress IP object associated with IP-based forwarding;

means for linking said ingress PPP object, said host object, and said egress PPP object, thereby forwarding data packets from a PPP session with said client over said Layer 2 tunnel; and means for linking said host object and said egress IP object, thereby forwarding IP frames received from said client over a link other than said Layer 2 tunnel.

42. The system according to claim 41, wherein said means for setting up includes means for forwarding control protocol negotiations.

43. The system according to claim 41, further including:

means for receiving an IP address through said Layer 2 tunnel, said IP address having been assigned to said client; and means for transferring said IP address to said client.

44. The system according to claim 41, wherein said user domain information is obtained from said PPP session creation request.

45. The system according to claim 41, wherein said user domain information is obtained using a user profile.

46. The system according to claim 41, wherein said user domain information is obtained from user identification information associated with a physical connection of said PPP session creation request.

47. The system according to claim 46, wherein said user domain information is obtained from a line number used by said client for transmitting said PPP session creation request.

48. The system according to claim 41, wherein said user domain information is obtained from user identification information associated with a physical location of said client.

49. The system according to claim 41, further comprising:

means for maintaining a forwarding information base for said host object, said forwarding information base containing at least one association between a network address and either said ingress PPP object or said egress PPP object.

50. The system according to claim 49, wherein said forwarding information base includes a default link to said egress PPP object.

51. The system according to claim 49, wherein said forwarding information base is stored in the form of a hash table.

52. The system according to claim 41, wherein said ingress PPP object includes an access PPP object associated with a PPP connection to said client via a first interface.

53. The system according to claim 52, wherein said egress PPP object includes:

a first connection object containing a range of IP addresses;

an aggregation PPP object associated with outgoing PPP frames; and a tunnel object associated with Layer 2 tunneling through a second interface.

54. The system according to claim 53, wherein said first connection object includes a list of network addresses.

55. The system according to claim 53, wherein said egress IP object includes:

a second connection object containing a range of IP addresses; and a service object associated with IP frame forwarding through a third interface.

56. The system according to claim 55, wherein said second connection object includes a list of network addresses.

57. The system according to claim 55, further comprising means for maintaining a forwarding information base for said host object, said forwarding information base containing:

an association between said access PPP object and an address of said client; and a default link to said aggregation PPP object.

58. The system according to claim 57, wherein said means for creating said first connection object includes means for adding into said forwarding information base an association between said aggregation PPP object and a corresponding network address, and said means for creating said second connection object includes means for adding into said forwarding information base an association between said service object and a corresponding network address.

59. A program storage device readable by a machine, tangibly embodying a program of instructions executable by the machine to perform a system for providing computer network access, the system including:

receiving a PPP session creation request from a client, said PPP session creation request including a control protocol frame encapsulated therein;

obtaining user domain information associated with said PPP session creation request;

setting up a Layer 2 tunnel for said client according to a parameter contained in said control protocol frame;

creating an ingress PPP object associated with an incoming PPP session, a host object associated with said client, and an egress PPP object associated with said Layer 2 tunnel;

creating an egress IP object based upon obtained user domain information, said egress IP object associated with IP-based forwarding;

linking said ingress PPP object, said host object, and said egress PPP object, thereby forwarding data packets from a PPP session with said client over said Layer 2 tunnel; and linking said host object and said egress IP object, thereby forwarding IP frames received from said client over a link other than said Layer 2 tunnel.

* * * * *